Sept. 10, 1929.  L. E. LA BRIE  1,727,994

BRAKE EQUALIZER

Filed Oct. 6, 1928

INVENTOR.
Ludger E. LaBrie
BY
M. W. McConkey
ATTORNEY.

Patented Sept. 10, 1929.

1,727,994

UNITED STATES PATENT OFFICE.

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS.

BRAKE EQUALIZER.

Application filed October 6, 1928. Serial No. 310,835.

This invention relates to brakes, and is illustrated as embodied in an automobile chassis having brakes on all four wheels. An object of the invention is to simplify the connections from the pedal or its equivalent, by the use of a vertically-arranged equalizer bar connected at its opposite ends to the rockshafts operating the front and rear sets of brakes, and to so construct the pedal connection with the bar as to insure operation of either front or rear brake connections, should the remaining connection fail to function.

In the embodiment selected for illustration, I prefer to provide the end of the link connecting the service pedal with the equalizer bar with a novel wedge-shaped fitting interposed between and pivotally connected to spaced arms constituting the bar.

According to an important feature of my invention, I propose to make this wedge-shaped fitting substantially T-shaped in section and to furthermore so shape the same as to function as a double stop for the bar. This I may accomplish by tapering the inner face of the rim of the fitting in both directions from the center to the side edges thereof, thus providing a stop for the bar in either direction of its swing and for the purpose previously described.

The above and other objects and features of the invention, including various combinations of parts and desirable particular constructions, will be apparent from the following description of the illustrated embodiment shown in the accompanying drawings, in which.

Figure 1:
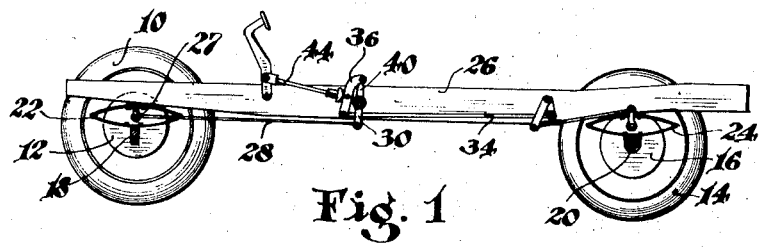
Figure 1 is a vertical section through the automobile chassis indicating the general arrangement of the brake linkage with my novel equalizer bar and pedal connection thereto.
Figure 2:
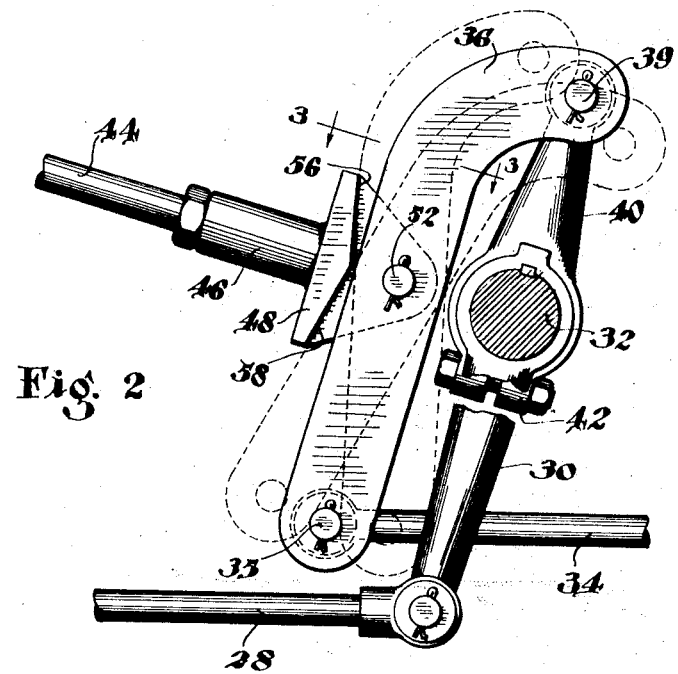
Figure 2 is a side elevation of the equalizer bar and its pedal and brake connections and further indicating by dotted lines possible positions of the parts with application of the brakes.
Figure 3:
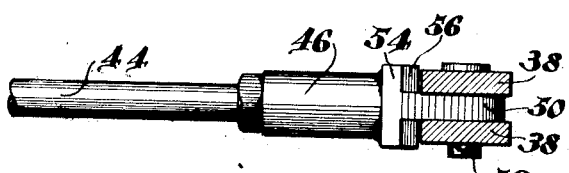
Figure 3 is a section taken on the line 3—3 of Figure 2 indicating in more detail the novel bar and pedal link connection thereto.

In the embodiment of my invention selected for illustration, front road wheels 10 having brakes 12 and rear wheels 14 having brakes 16 support the front and rear axles 18 and 20 which in turn, through the usual springs 22 and 24, support the chassis frame 26. The front brakes 12, operated by suitable controls 27, may be connected by links or cables 28, one each to one of the two arms 30 keyed to the rockshaft 32.

The rear brakes 16 may be operated through the medium of a link or cable 34 suitably connected to actuate the brakes and pivoted at 35 to a vertically arranged equalizer bar 36 positioned just in front of the rockshaft 32.

The equalizer bar may comprise spaced flat stampings 38 of like construction, being preferably relatively long and narrow. The arms are each preferably curved at their upper ends and pivotally connected at 39 to a crank arm 40 rigidly secured to the rockshaft at 42.

According to an important feature of my invention, I propose to insure the operation of at least one of the sets of brakes, front or rear, despite breakage of one or the other of the connecting linkages.

This I propose to accomplish by attaching to one end of the service pedal link 44 a fitting 46 preferably provided with a T-sectioned head 48 and a stem having a threaded engagement with the link. The web 50 of the head is preferably wedge-shaped and provided with an opening at its lower side to accommodate the pivot pin 52 connecting the same to the equalizer bar. The thickness of the rim 54 is preferably varied to provide faces 56 and 58 tapering from a central point to the sides of the head and providing flats functioning as stops for the pivoted bar.

In operation longitudinal movement of the link 44 with application of the service pedal serves to draw the equalizer bar forward and with it the crank arm 40 and link 34. The perpendicular distances from pivots 35 and 39 to the line of link 44 being equal, the bar will pivot about pin 52 until the resistances of the front and rear brakes are equal, whereupon further pedal pressure will transmit equal braking pressures to the two sets of brakes.

Should either one of the two sets fail for any reason, as for example, by breakage, the bar will automatically contact with one or the other of stops 56 or 58 preventing further relative movement of the bar and service pedal link 44. Any further pressure on the pedal will be transmitted uninterruptedly to the remaining set of brakes. The inclination or taper of the faces 56 and 58 may be predetermined to suit the necessary movements of the bar and still function for the purpose desired.

A very simple arrangement is thus presented for permitting equalization of braking pressures to the front and rear sets of brakes and at the same time obviating total loss of the indispensable braking effect upon failure of either set of brakes.

While one embodiment of my invention has been described in detail, it is not my intention to limit its scope to that particular embodiment or otherwise than by the terms of the appended claims.

I claim:

1. A vehicle having front and rear sets of brakes and having, in combination therewith, a rockshaft operating each set of brakes, each of said rockshafts having a generally vertical operating arm, a vertical equalizer bar connected at one end to one of said arms and extending vertically past the corresponding rockshaft, a connection from the other end of the equalizer bar extending past said corresponding rockshaft to the arm on the other rockshaft, an operating lever, and a connection from said lever to the central part of the equalizer bar, said connection being so constructed and arranged as to insure operation of at least one of said rockshafts despite the failure of the connection with the remaining rockshaft.

2. A brake mechanism comprising, in combination, an equalizer bar having separate tension means connected to each end thereof, an actuating link connected to the bar intermediate said ends, the connection between said bar and link being so constructed as to insure actuation of at least one of said tension means upon failure of the other.

3. A brake mechanism including an equalizer bar having an operating tension element pivotally connected thereto, said bar characterized by being in two similar relatively long and narrow parts, each part curved at the same end.

4. A brake mechanism including a two-part equalizer bar having a T-sectioned tensioning link part pivoted thereto.

5. A brake structure comprising, in combination with a two-part equalizer bar, a T-sectioned tensioning link part pivoted to said bar intermediate its ends, said link part characterized by having the web of the same interposed between the parts of the bar.

6. A brake structure comprising an equalizer bar, together with a fitting having a stem and T-sectioned head, the web of the head being pivoted to said bar.

7. A brake structure comprising an equalizer bar, together with a fitting pivoted thereto, which fitting is so constructed as to act as a double stop to determine the movement of said bar about said pivot.

8. A brake structure including a fitting of T-shape in section, the rim of the fitting being tapered from a central point to its side edges.

9. A means for providing an equal division of an actuating force, comprising, in combination, a relatively long bar and a tension link part pivoted thereto, said part provided with tapered flats functioning as stops to limit pivotal movement of said bar.

In testimony whereof, I have hereunto signed my name.

LUDGER E. LA BRIE.

DISCLAIMER 1,727,994.—*Ludger E. La Brie*, South Bend, Ind. BRAKE EQUALIZER. Patent dated September 10, 1929. Disclaimer filed October 17, 1938, by the assignee, *Bendix Brake Company*.

Hereby enters this disclaimer of claims 1, 2, and 7 of said patent.

[*Official Gazette November 8, 1938.*]